(12) United States Patent
Wyatt et al.

(10) Patent No.: US 9,047,085 B2
(45) Date of Patent: Jun. 2, 2015

(54) METHOD AND APPARATUS FOR CONTROLLING SPARSE REFRESH OF A SELF-REFRESHING DISPLAY DEVICE USING A COMMUNICATIONS PATH WITH AN AUXILIARY COMMUNICATIONS CHANNEL FOR DELIVERING DATA TO THE DISPLAY

(75) Inventors: David Wyatt, San Jose, CA (US); David Matthew Stears, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 38 days.

(21) Appl. No.: 13/047,642

(22) Filed: Mar. 14, 2011

(65) Prior Publication Data

US 2012/0236013 A1    Sep. 20, 2012

(51) Int. Cl.
*G06F 1/00* (2006.01)
*G06F 1/26* (2006.01)
*G06F 1/32* (2006.01)
*G06T 15/00* (2011.01)

(52) U.S. Cl.
CPC .......... *G06F 1/325* (2013.01); *G09G 2330/021* (2013.01); *G06T 15/005* (2013.01); *G06F 1/3265* (2013.01); *G06F 1/3278* (2013.01); *Y02B 60/126* (2013.01); *Y02B 60/1242* (2013.01)

(58) Field of Classification Search
CPC ............. G06F 1/325; G09G 2330/021; G09G 3/3648; G06T 15/005
USPC .......................... 713/320, 2, 323; 345/211, 90
See application file for complete search history.

(56) References Cited

U.S. PATENT DOCUMENTS

| 6,378,018 | B1* | 4/2002 | Tsern et al. ................... 710/313 |
| 7,417,630 | B2 | 8/2008 | Kojima et al. |
| 2004/0189570 | A1* | 9/2004 | Selwan .......................... 345/90 |
| 2007/0152993 | A1* | 7/2007 | Mesmer et al. ............... 345/211 |

(Continued)

FOREIGN PATENT DOCUMENTS

| CN | 1945421 A | 4/2007 |
| CN | 101154329 A | 4/2008 |
| JP | 2005-049665 A | 2/2005 |

OTHER PUBLICATIONS

GB Search Report, GB1204498.8 dated Jul. 2, 2012.

(Continued)

*Primary Examiner* — Thomas Lee
*Assistant Examiner* — Robert Cassity
(74) *Attorney, Agent, or Firm* — Artegis Law Group, LLP

(57) ABSTRACT

A method and apparatus for controlling sparse refresh of a self-refreshing display device coupled to a graphics controller are disclosed. The display device includes capabilities to drive the display based on video signals generated from a local frame buffer. The graphics controller may optimally be placed in one or more power-saving states when the display device is operating in a panel self-refresh mode. When exiting the power-saving state to update the image displayed by the display device, a fast-resume initialization routine may be run to reconfigure the GPU when operating in a sparse refresh mode, i.e., where the image being displayed on the display device is updated infrequently. In such cases, the graphics controller may be configured to receive instructions and data from a central processing unit via an alternative low-bandwidth communications path instead of the high-bandwidth communications path used in normal operation.

23 Claims, 10 Drawing Sheets

(56) References Cited

U.S. PATENT DOCUMENTS

| | | |
|---|---|---|
| 2007/0260867 A1* | 11/2007 | Ethier et al. ............... 713/2 |
| 2007/0285428 A1 | 12/2007 | Foster et al. |
| 2008/0143695 A1 | 6/2008 | Juenemann et al. |
| 2009/0061918 A1* | 3/2009 | Emara et al. ............. 455/522 |
| 2009/0204837 A1* | 8/2009 | Raval et al. .............. 713/330 |
| 2009/0219932 A1* | 9/2009 | Kobayashi ............... 370/389 |
| 2010/0050003 A1* | 2/2010 | Liebenow ................ 713/310 |
| 2011/0060928 A1* | 3/2011 | Khodorkovsky et al. ..... 713/323 |
| 2011/0279655 A1* | 11/2011 | Tan .............................. 348/49 |
| 2012/0079295 A1 | 3/2012 | Hayek et al. |
| 2012/0146968 A1* | 6/2012 | Glen ......................... 345/204 |

OTHER PUBLICATIONS

GB Examination Report dated Jan. 15, 2013, Application No. GB1204498.8.

* cited by examiner

| | eDP Lane$_0$ | eDP Lane$_1$ | eDP Lane$_2$ | eDP Lane$_3$ |
|---|---|---|---|---|
| 255(00) | BS | BS | BS | BS |
| 255(01) | VB-ID | VB-ID | VB-ID | VB-ID |
| 255(02) | Mvid7:0 | Mvid7:0 | Mvid7:0 | Mvid7:0 |
| 255(03) | Maud7:0 | Maud7:0 | Maud7:0 | Maud7:0 |
| 255(04) | ... | ... | ... | ... |
| 255(05) | BE | BE | BE | BE |
| 255(06) | P0:R[7:0] | P1:R[7:0] | P2:R[7:0] | P3:R[7:0] |
| 255(07) | P0:G[7:0] | P1:G[7:0] | P2:G[7:0] | P3:G[7:0] |
| 255(08) | P0:B[7:0] | P1:B[7:0] | P2:B[7:0] | P3:B[7:0] |
| 255(09) | P4:R[7:0] | P5:R[7:0] | P6:R[7:0] | P7:R[7:0] |
| 255(10) | P4:G[7:0] | P5:G[7:0] | P6:G[7:0] | P7:G[7:0] |
| 255(11) | P4:B[7:0] | P5:B[7:0] | P6:B[7:0] | P7:B[7:0] |
| 255(12) | ... | ... | ... | ... |
| 255(13) | PN-1:B[7:0] | PN:B[7:0] | [Padded 0s] | [Padded 0s] |
| 255(14) | BS | BS | BS | BS |
| 255(15) | VB-ID | VB-ID | VB-ID | VB-ID |
| 255(16) | Mvid7:0 | Mvid7:0 | Mvid7:0 | Mvid7:0 |
| 255(17) | Maud7:0 | Maud7:0 | Maud7:0 | Maud7:0 |
| | ... | ... | ... | ... |
| | 251 | 252 | 253 | 254 |

Figure 2C

METHOD AND APPARATUS FOR CONTROLLING SPARSE REFRESH OF A SELF-REFRESHING DISPLAY DEVICE USING A COMMUNICATIONS PATH WITH AN AUXILIARY COMMUNICATIONS CHANNEL FOR DELIVERING DATA TO THE DISPLAY

BACKGROUND OF THE INVENTION

1. Field of the Invention

The invention relates generally to display systems and, more specifically, to a method and apparatus for controlling sparse refresh of a self-refreshing display device coupled to a graphics controller.

2. Description of the Related Art

Computer systems typically include some sort of display device, such as a liquid crystal display (LCD) device, coupled to a graphics controller. During normal operation, the graphics controller generates video signals that are transmitted to the display device by scanning-out pixel data from a frame buffer based on timing information generated within the graphics controller. Some recently designed display devices have a self-refresh capability, where the display device includes a local controller configured to generate video signals from a static, cached frame of digital video independently from the graphics controller. When in such a self-refresh mode, the video signals are driven by the local controller, thereby allowing portions of the graphics controller to be turned off to reduce the overall power consumption of the computer system. Once in self-refresh mode, when the image to be displayed needs to be updated, control may be transitioned back to the graphics controller to allow new video signals to be generated based on a new set of pixel data.

When in a self-refresh mode, the graphics controller may be placed in a power-saving state such as a deep sleep state. In addition, the main communications channel between a central processing unit (CPU) and the graphics controller may be turned off to conserve energy. When the image needs to be updated, the computer system "wakes-up" the graphics controller and any associated communications channels. The graphics controller may then process the new image data and transmit the processed image data to the display device for display.

One drawback to updating the image is that "waking-up" the graphics controller and associated communications channels may take a significant amount of time. For example, waking up a PCIe bus may take 70-100 ms or more. Such delays introduce latencies between the time the CPU attempts to update an image and the time the processed image is displayed via the display device. When frequently entering and exiting a self-refresh mode, such delays may become distracting to a user of the computer system. Furthermore, the computer system may consume unnecessary amounts of energy in order to initialize the graphics controller and associated communications channels for relatively minor tasks.

As the foregoing illustrates, what is needed in the art is an improved technique for updating the cached frame of video data in a self-refreshing display device.

SUMMARY OF THE INVENTION

One embodiment of the present invention sets forth a method for controlling a display device that has self-refresh capabilities. The method includes the steps of exiting a power-saving state, executing a fast resume routine that includes a portion of the operations included in a full initialization routine, generating updated pixel data for display on the display device based on commands and data received via an auxiliary communications channel, transmitting the updated pixel data to the display device, and returning to the power-saving state.

One advantage of the disclosed technique is that initialization of the GPU as well as high speed communication channels may be minimized. The technique exploits the fact that, while operating in a sparse refresh mode, the bandwidth required to pass commands and data to a graphics controller may be small. Therefore, high speed communication channels may be bypassed in favor of low speed communication channels that require less time and energy to configure. In so doing, the time required to update a small amount of image data stored in the display device and the overall power consumption of the computer system are reduced.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2C is a conceptual diagram of digital video signals generated by a GPU for transmission over communications path, according to one embodiment of the present invention;

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
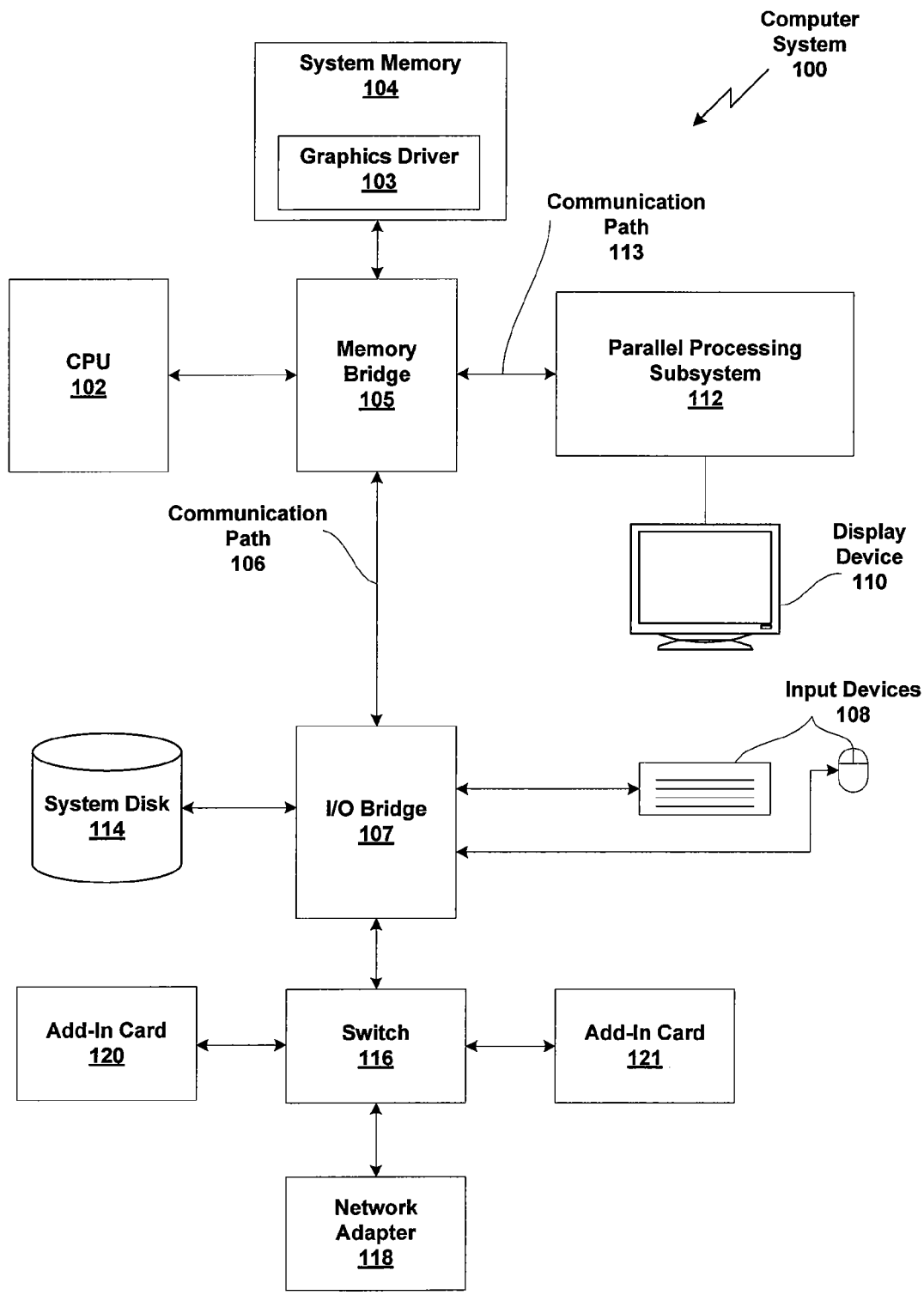
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A graphics driver 103 may be configured to send graphics primitives over communication path 113 for parallel processing subsystem 112 to generate pixel data for display on display device 110. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2A:
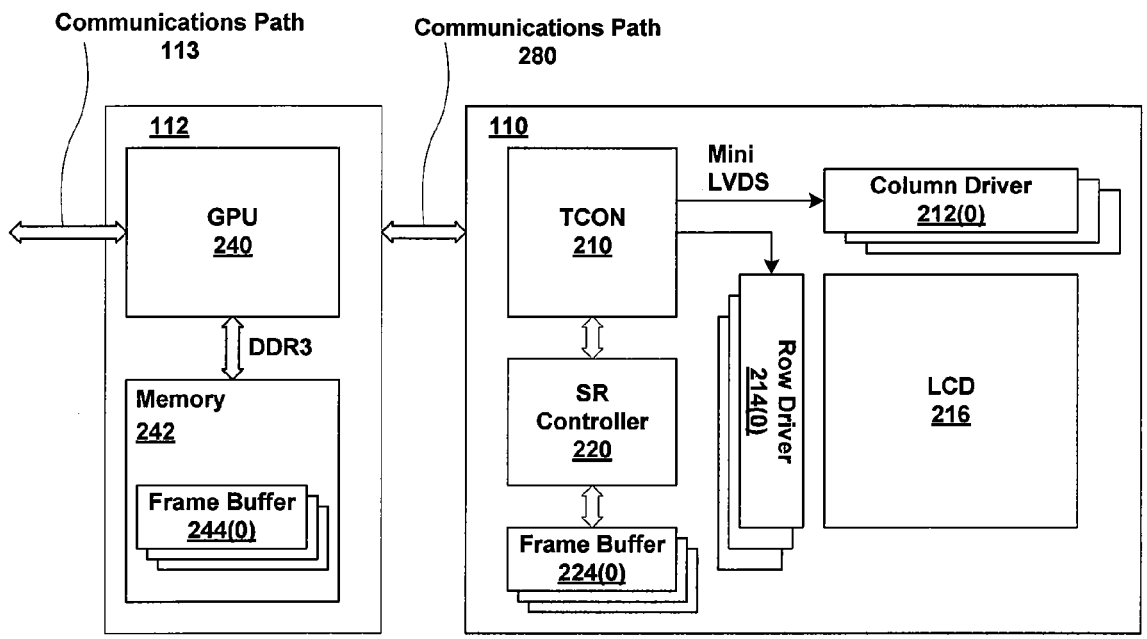
FIG. 2A illustrates a parallel processing subsystem coupled to a display device that includes a self-refreshing capability, according to one embodiment of the present invention.

FIG. 2A illustrates a parallel processing subsystem 112 coupled to a display device 110 that includes a self-refreshing capability, according to one embodiment of the present invention. As shown, parallel processing subsystem 112 includes a graphics processing unit (GPU) 240 coupled to a graphics memory 242 via a DDR3 bus interface. Graphics memory 242 includes one or more frame buffers 244(0), 244(1) . . . 244(N-1), where N is the total number of frame buffers implemented in parallel processing subsystem 112. Parallel processing subsystem 112 is configured to generate video signals based on pixel data stored in frame buffers 244 and transmit the video signals to display device 110 via communications path 280. Communications path 280 may be any video interface known in the art, such as an embedded Display Port (eDP) interface or a low voltage differential signal (LVDS) interface.

GPU 240 may be configured to receive graphics primitives from CPU 102 via communications path 113, such as a PCIe bus. GPU 240 processes the graphics primitives to produce a frame of pixel data for display on display device 110 and stores the frame of pixel data in frame buffers 244. In normal operation, GPU 240 is configured to scan out pixel data from frame buffers 244 to generate video signals for display on display device 110. In one embodiment, GPU 240 is configured to generate a digital video signal and transmit the digital video signal to display device 110 via a digital video interface such as an LVDS, DVI, HDMI, or DisplayPort (DP) interface. In another embodiment, GPU 240 may be configured to generate an analog video signal and transmit the analog video signal to display device 110 via an analog video interface such as a VGA or DVI-A interface. In embodiments where communications path 280 implements an analog video interface, display device 110 may convert the received analog video signal into a digital video signal by sampling the analog video signal with one or more analog to digital converters.

As also shown in FIG. 2A, display device 110 includes a timing controller (TCON) 210, self-refresh controller (SRC) 220, a liquid crystal display (LCD) device 216, one or more column drivers 212, one or more row drivers 214, and one or more local frame buffers 224(0), 224(1) . . . 224(M-1), where M is the total number of local frame buffers implemented in display device 110. TCON 210 generates video timing signals for driving LCD device 216 via the column drivers 212 and row drivers 214. Column drivers 212, row drivers 214 and LCD device 216 may be any conventional column drivers, row drivers, and LCD device known in the art. As also shown, ICON 210 may transmit pixel data to column drivers 212 and row drivers 214 via a communication interface, such as a mini LVDS interface.

SRC 220 is configured to generate video signals for display on LCD device 216 based on pixel data stored in local frame buffers 224. In normal operation, display device 110 drives LCD device 216 based on the video signals received from parallel processing subsystem 112 over communications path 280. In contrast, when display device 110 is operating in a panel self-refresh mode, display device 110 drives LCD device 216 based on the video signals received from SRC 220.

GPU 240 may be configured to manage the transition of display device 110 into and out of a panel self-refresh mode. Ideally, the overall power consumption of computer system 100 may be reduced by operating display device 110 in a panel self-refresh mode during periods of graphical inactivity in the image displayed by display device 110. In one embodiment, to cause display device 110 to enter a panel self-refresh mode, GPU 240 may transmit a message to display device 110 using an in-band signaling method, such as by embedding a message in the digital video signals transmitted over communications path 280. In alternative embodiments, GPU 240 may transmit the message using a side-band signaling method, such as by transmitting the message using an auxiliary communications channel. Various signaling methods for signaling display device 110 to enter or exit a panel self-refresh mode are described below in conjunction with FIGS. 2B-2D.

Returning now to FIG. 2A, after receiving the message to enter the self-refresh mode, display device 110 caches the next frame of pixel data received over communications path 280 in local frame buffers 224. Display device 110 transitions control for driving LCD device 216 from the video signals generated by GPU 240 to video signals generated by SRC 220 based on the pixel data stored in local frame buffers 224. While the display device 110 is in the panel self-refresh mode, SRC 220 continuously generates repeating video signals representing the cached pixel data stored in local frame buffers 224 for one or more consecutive video frames.

In order to cause display device 110 to exit the panel self-refresh mode, GPU 240 may transmit a similar message to display device 110 using a similar method as that described above in connection with causing display device 110 to enter the panel self-refresh mode. After receiving the message to exit the panel self-refresh mode, display device 110 may be configured to ensure that the pixel locations associated with the video signals generated by GPU 240 are aligned with the pixel locations associated with the video signals generated by SRC 220 currently being used to drive LCD device 216 in the panel self-refresh mode. Once the pixel locations are aligned, display device may transition control for driving LCD device 216 from the video signals generated by SRC 220 to the video signals generated by GPU 240.

The amount of storage required to implement a self-refresh capability may be dependent on the size of the uncompressed frame of video used to continuously refresh the image on the display device 110. In one embodiment, display device 110 includes a single local frame buffer 224(0) that is sized to accommodate an uncompressed frame of pixel data for display on LCD device 216. The size of frame buffer 224(0) may be based on the minimum number of bytes required to store an uncompressed frame of pixel data for display on LCD device 216, calculated as the result of multiplying the width by the height by the color depth of the native resolution of LCD device 216. For example, frame buffer 224(0) could be sized for an LCD device 216 configured with a WUXGA resolution (1920×1200 pixels) and a color depth of 24 bits per pixel (bpp). In this case, the amount of storage in local frame buffer 224(0) available for self-refresh pixel data caching should be at least 6750 kB of addressable memory (1920*1200*24 bpp; where 1 kilobyte is equal to 1024 or $2^{10}$ bytes).

In another embodiment, local frame buffer 224(0) may be of a size that is less than the number of bytes required to store an uncompressed frame of pixel data for display on LCD device 216. In such a case, the uncompressed frame of pixel data may be compressed by SRC 220, such as by run length encoding the uncompressed pixel data, and stored in frame buffer 224(0) as compressed pixel data. In such embodiments, SRC 220 may be configured to decode the compressed pixel data before generating the video signals used to drive LCD device 216. In yet other embodiments, GPU 240 may compress the frame of pixel data prior to encoding the compressed pixel data in the digital video signals transmitted to display device 110. For example, GPU 240 may be configured to encode the pixel data using an MPEG-2 format. In such embodiments, SRC 220 may store the compressed pixel data in local frame buffer 224(0) in the compressed format and decode the compressed pixel data before generating the video signals used to drive LCD device 216.

Display device 110 may be capable of displaying 3D video data, such as stereoscopic video data. Stereoscopic video data includes a left view and a right view of uncompressed pixel data for each frame of 3D video. Each view corresponds to a different camera position of the same scene captured approximately simultaneously. Some display devices are capable of displaying three or more views simultaneously, such as in some types of auto-stereoscopic displays.

In one embodiment, display device 110 may include a self-refresh capability in connection with stereoscopic video data. Each frame of stereoscopic video data includes two uncompressed frames of pixel data for display on LCD device 216. Each of the uncompressed frames of pixel data may be comprised of pixel data at the full resolution and color depth of LCD device 216. In such embodiments, local frame buffer 224(0) may be sized to hold one frame of stereoscopic video data. For example, to store uncompressed stereoscopic video data at WUXGA resolution and 24 bpp color depth, the size of local frame buffer 224(0) should be at least 13500 kB of addressable memory (2*1920*1200*24 bpp). Alternatively, local frame buffers 224 may include two frame buffers 224(0) and 224(1), each sized to store a single view of uncompressed pixel data for display on LCD device 216.

In yet other embodiments, SRC 220 may be configured to compress the stereoscopic video data and store the compressed stereoscopic video data in local frame buffers 224. For example, SRC 220 may compress the stereoscopic video data using Multiview Video Coding (MVC) as specified in the H.264/MPEG-4 AVC video compression standard. Alternatively, GPU 240 may compress the stereoscopic video data prior to encoding the compressed video data in the digital video signals for transmission to display device 110.

In one embodiment, display device 110 may include a dithering capability. Dithering allows display device 110 to display more perceived colors than the hardware of LCD device 216 is capable of displaying. Temporal dithering alternates the color of a pixel rapidly between two approximate colors in the available color palette of LCD device 216 such that the pixel is perceived as a different color not included in the available color palette of LCD device 216. For example, by alternating a pixel rapidly between white and black, a viewer may perceive the color gray. In a normal operating state, GPU 240 may be configured to alternate pixel data in successive frames of video such that the perceived colors in the image displayed by display device 110 are outside of the available color palette of LCD device 216. In a self-refresh mode, display device 110 may be configured to cache two successive frames of pixel data in local frame buffers 224. Then, SRC 220 may be configured to scan out the two frames of pixel data from local frame buffers 224 in an alternating fashion to generate the video signals for display on LCD device 216.

Figure 2B:
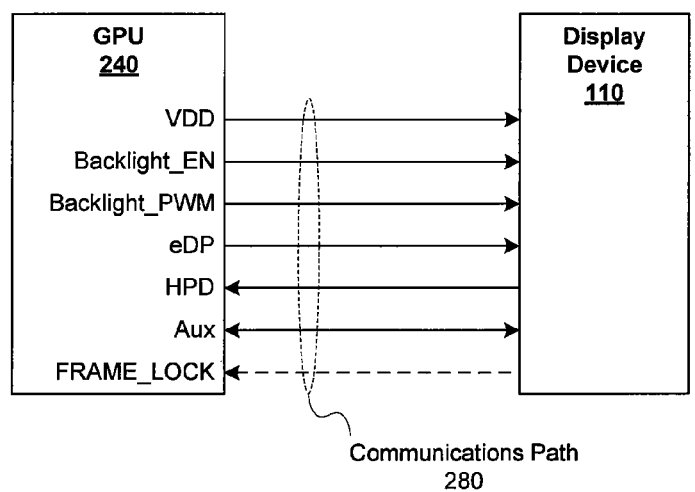
FIG. 2B illustrates a communications path that implements an embedded DisplayPort interface, according to one embodiment of the present invention.

FIG. 2B illustrates a communications path 280 that implements an embedded DisplayPort interface, according to one embodiment of the present invention. Embedded DisplayPort (eDP) is a standard digital video interface for internal display devices, such as an internal LCD device in a laptop computer. Communications path 280 includes a main link (eDP) that includes 1, 2 or 4 differential pairs (lanes) for high bandwidth data transmission. The eDP interface also includes a panel enable signal (VDD), a backlight enable signal (Backlight_EN), a backlight pwm signal (Backlight_PWM), and a hot-plug detect signal (HPD) as well as a single differential pair auxiliary channel (Aux). The main link is a unidirectional communication channel from GPU 240 to display device 110. In one embodiment, GPU 240 may be configured to transmit video signals generated from pixel data stored in frame buffers 244 over a single lane of the eDP main link. In alternative embodiments, GPU 240 may be configured to transmit the video signals over 2 or 4 lanes of the eDP main link.

The panel enable signal VDD may be connected from GPU to the display device 110 to turn on power in display device 110. The backlight enable and backlight pwm signals control the intensity of the backlight in display device 110 during normal operation. However, when the display device 110 is operating in a panel self-refresh mode, control for these signals must be handled by ICON 210 and may be changed by SRC 220 via control signals received over the auxiliary communication channel (Aux). One of skill in the art will recognize that the intensity of the backlight may be controlled by pulse width modulating a signal via the backlight pwm signal (Backlight_PWM). In some embodiments, communications path 280 may also include a frame lock signal (FRAME_LOCK) that indicates a vertical sync in the video signals generated by SRC 220. The FRAME_LOCK signal may be used to resynchronize the video signals generated by GPU 240 with the video signals generated by SRC 220.

The hot-plug detect signal, HPD, may be a signal connected from the display device 110 to GPU 240 for detecting a hot-plug event or for communicating an interrupt request from display device 110 to GPU 240. To indicate a hot-plug event, display device drives HPD high to indicate that a display device has been connected to communications path 280. After display device is connected to communications path 280, display device 110 may signal an interrupt request by quickly pulsing the HPD signal low for between 0.5 and 1 millisecond.

The auxiliary channel, Aux, is a low bandwidth, bidirectional half-duplex data communication channel used for transmitting command and control signals from GPU 240 to display device 110 as well as from display device 110 to GPU 240. In one embodiment, messages indicating that display device 110 should enter or exit a panel self-refresh mode may be communicated over the auxiliary channel. On the auxiliary channel, GPU 240 is a master device and display device 110 is a slave device. In such a configuration, data or messages may be sent from display device 110 to GPU 240 using the following technique. First, display device 110 indicates to GPU 240 that display device 110 would like to send traffic over the auxiliary channel by initiating an interrupt request over the hot-plug detect signal, HPD. When GPU 240 detects an interrupt request, GPU 240 sends a transaction request message to display device 110. Once display device 110 receives the transaction request message, display device 110 then responds with an acknowledgement message. Once GPU 240 receives the acknowledgement message, GPU 240 may read one or more register values in display device 110 to retrieve the data or messages over the auxiliary channel.

It will be appreciated by those of skill in the art that communications path 280 may implement a different video interface for transmitting video signals between GPU 240 and display device 110. For example, communications path 280 may implement a high definition multimedia interface (HDMI) or a low voltage differential signal (LVDS) video interface such as open-LDI. The scope of the invention is not limited to an Embedded DisplayPort video interface.

FIG. 2C is a conceptual diagram of digital video signals 250 generated by a GPU 240 for transmission over communications path 280, according to one embodiment of the present invention. As shown, digital video signals 250 is formatted for transmission over four lanes (251, 252, 253 and 254) of the main link of an eDP video interface. The main link of the eDP video interface may operate at one of three link symbol clock rates, as specified by the eDP specification (162 MHz, 270 MHz or 540 MHz). In one embodiment, GPU 240 sets the link symbol clock rate based on a link training operation that is performed to configure the main link when a display device 110 is connected to communications path 280. For each link symbol clock cycle 255, a 10-bit symbol, which encodes one byte of data or control information using 8b/10b encoding, is transmitted on each active lane of the eDP interface.

The format of digital video signals 250 enables secondary data packets to be inserted directly into the digital video signals 250 transmitted to display device 110. In one embodiment, the secondary data packets may include messages sent from GPU 240 to display device 110 that request display device 110 to enter or exit a panel self-refresh mode. Such secondary data packets enable one or more aspects of the invention to be realized over the existing physical layer of the eDP interface. It will be appreciated that this form of in-line signaling may be implemented in other packet based video interfaces and is not limited to embodiments implementing an eDP interface.

Secondary data packets may be inserted into digital video signals 250 during the vertical or horizontal blanking periods of the video frame represented by digital video signals 250. As shown in FIG. 2C, digital video signals 250 are packed one horizontal line of pixel data at a time. For each horizontal line of pixel data, the digital video signals 250 include a blanking start (BS) framing symbol during a first link clock cycle 255(00) and a corresponding blanking end (BE) framing symbol during a subsequent link clock cycle 255(05). The portion of digital video signals 250 between the BS symbol at link symbol clock cycle 255(00) and the BE symbol at link symbol clock cycle 255(5) corresponds to the horizontal blanking period.

Control symbols and secondary data packets may be inserted into digital video signals 250 during the horizontal blanking period. For example, a VB-ID symbol is inserted in the first link symbol clock cycle 255(01) after the BS symbol. The VB-ID symbol provides display device 110 with information such as whether the main video stream is in the vertical blanking period or the vertical display period, whether the main video stream is interlaced or progressive scan, and whether the main video stream is in the even field or odd field for interlaced video. Immediately following the VB-ID symbol, a video time stamp (Mvid7:0) and an audio time stamp (Maud7:0) are inserted at link symbol clock cycles 255(02) and 255(03), respectively. Dummy symbols may be inserted during the remainder of the link symbol clock cycles 255(04) during the horizontal blanking period. Dummy symbols may be a special reserved symbol indicating that the data in that lane during that link symbol clock cycle is dummy data. Link symbol clock cycles 255(04) may have a duration of a number of link symbol clock cycles such that the frame rate of digital video signals 250 over communications path 280 is equal to the refresh rate of display device 110.

A secondary data packet may be inserted into digital video signals 250 by replacing a plurality of dummy symbols during link symbol clock cycles 255(04) with the secondary data packet. A secondary data packet is framed by the special secondary start (SS) and secondary end (SE) framing symbols. Secondary data packets may include an audio data packet, link configuration information, or a message requesting display device 110 to enter or exit a panel self-refresh mode.

The BE framing symbol is inserted in digital video signals 250 to indicate the start of active pixel data for a horizontal line of the current video frame. As shown, pixel data P0 ... PN has a RGB format with a per channel bit depth (bpc) of 8-bits. Pixel data P0 associated with the first pixel of the horizontal line of video is packed into the first lane 251 at link symbol clock cycles 255(06) through 255(08) immediately following the BE symbol. A first portion of pixel data P0 associated with the red color channel is inserted into the first lane 251 at link symbol clock cycle 255(06), a second portion of pixel data P0 associated with the green color channel is inserted into the first lane 251 at link symbol clock cycle 255(07), and a third portion of pixel data P0 associated with the blue color channel is inserted into the first lane 251 at link symbol clock cycle 255(08). Pixel data P1 associated with the second pixel of the horizontal line of video is packed into the second lane 252 at link symbol clock cycles 255(06) through 255(08), pixel data P2 associated with the third pixel of the horizontal line of video is packed into the third lane 253 at link symbol clock cycles 255(06) through 255(08), and pixel data P3 associated with the fourth pixel of the horizontal line of video is packed into the fourth lane 254 at link symbol clock cycles 255(06) through 255(08). Subsequent pixel data of the horizontal line of video are inserted into the lanes 251-254 in a similar fashion to pixel data P0 through P3. In the last link symbol clock cycle to include valid pixel data, any unfilled lanes may be padded with zeros. As shown, the third lane 253 and the fourth lane 254 are padded with zeros at link symbol clock cycle 255(13).

The sequence of data described above repeats for each horizontal line of pixel data in the frame of video, starting with the top most horizontal line of pixel data. A frame of video may include a number of horizontal lines at the top of the frame that do not include active pixel data for display on display device 110. These horizontal lines comprise the vertical blanking period and may be indicated in digital video signals 250 by setting a bit in the VB-ID control symbol.

Figure 2D:
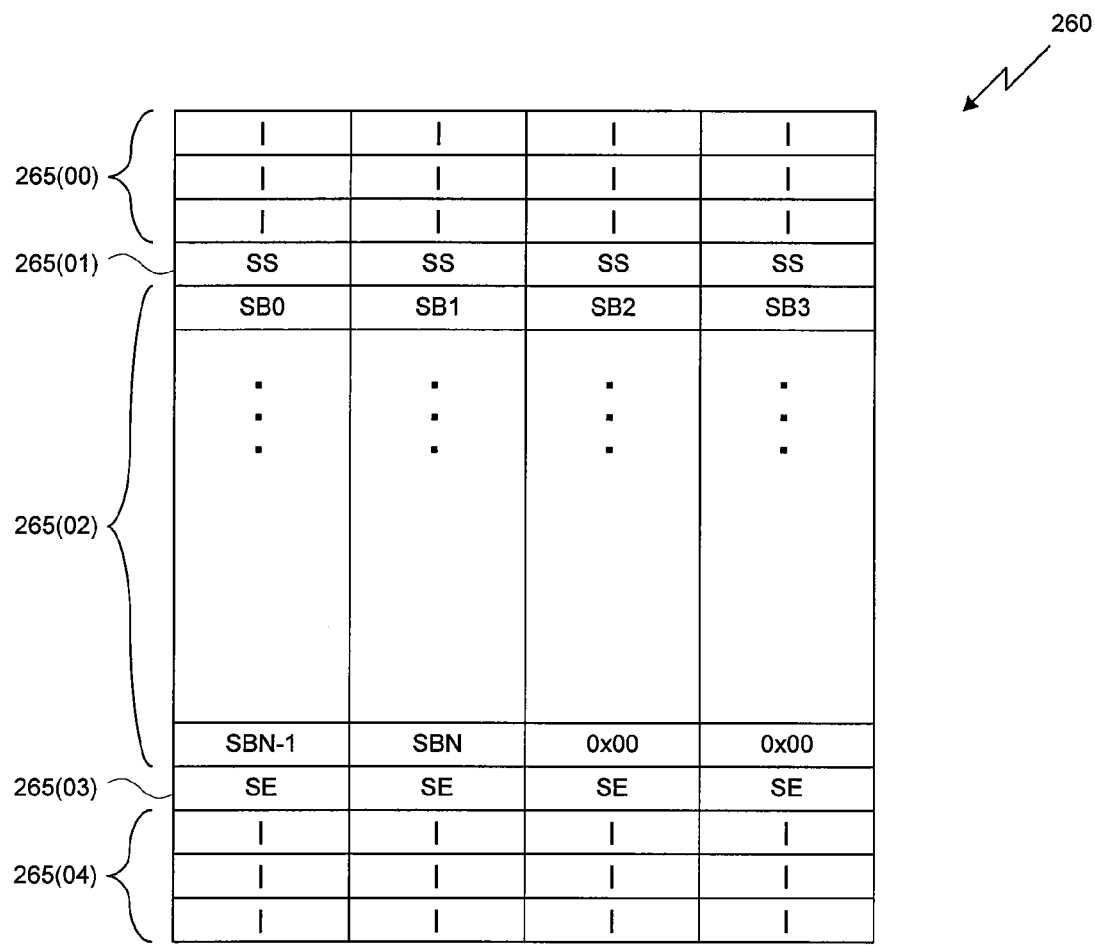
FIG. 2D is a conceptual diagram of a secondary data packet inserted in the horizontal blanking period of the digital video signals of FIG. 2C, according to one embodiment of the present invention.

FIG. 2D is a conceptual diagram of a secondary data packet 260 inserted in the horizontal blanking period of the digital video signals 250 of FIG. 2C, according to one embodiment of the present invention. A secondary data packet 260 may be inserted into digital video signals 250 by replacing a portion of the plurality of dummy symbols in digital video signals 250. For example, FIG. 2D shows a plurality of dummy symbols at link symbol clock cycles 265(00) and 265(04). GPU 240 may insert a secondary start (SS) framing symbol at link symbol clock cycle 265(01) to indicate the start of a secondary data packet 260. The data associated with the secondary data packet 260 is inserted at link symbol clock cycles 265(02). Each byte of the data (SB0 ... SBN) associated with the secondary data packet 260 is inserted in one of the lanes 251-254 of digital video signals 250. Any slots not filled with data may be padded with zeros. GPU 240 then inserts a secondary end (SE) framing symbol at link symbol clock cycle 265(03).

In one embodiment, the secondary data packet 260 may include a header and data indicating that the display device 110 should enter or exit a self-refresh mode. For example, the secondary data packet 260 may include a reserved header code that indicates that the packet is a panel self-refresh packet. The secondary data packet may also include data that indicates whether display device 110 should enter or exit a panel self-refresh mode.

As described above, GPU 240 may send messages to display device 110 via an in-band signaling method, using the existing communications channel for transmitting digital video signals 250 to display device 110. In alternative embodiments, GPU 240 may send messages to display device 110 via a side-band method, such as by using the auxiliary communications channel in communications path 280. In yet other embodiments, a dedicated communications path, such as an additional cable, may be included to provide signaling to display device 110 to enter or exit the panel self-refresh mode.

Figure 3:
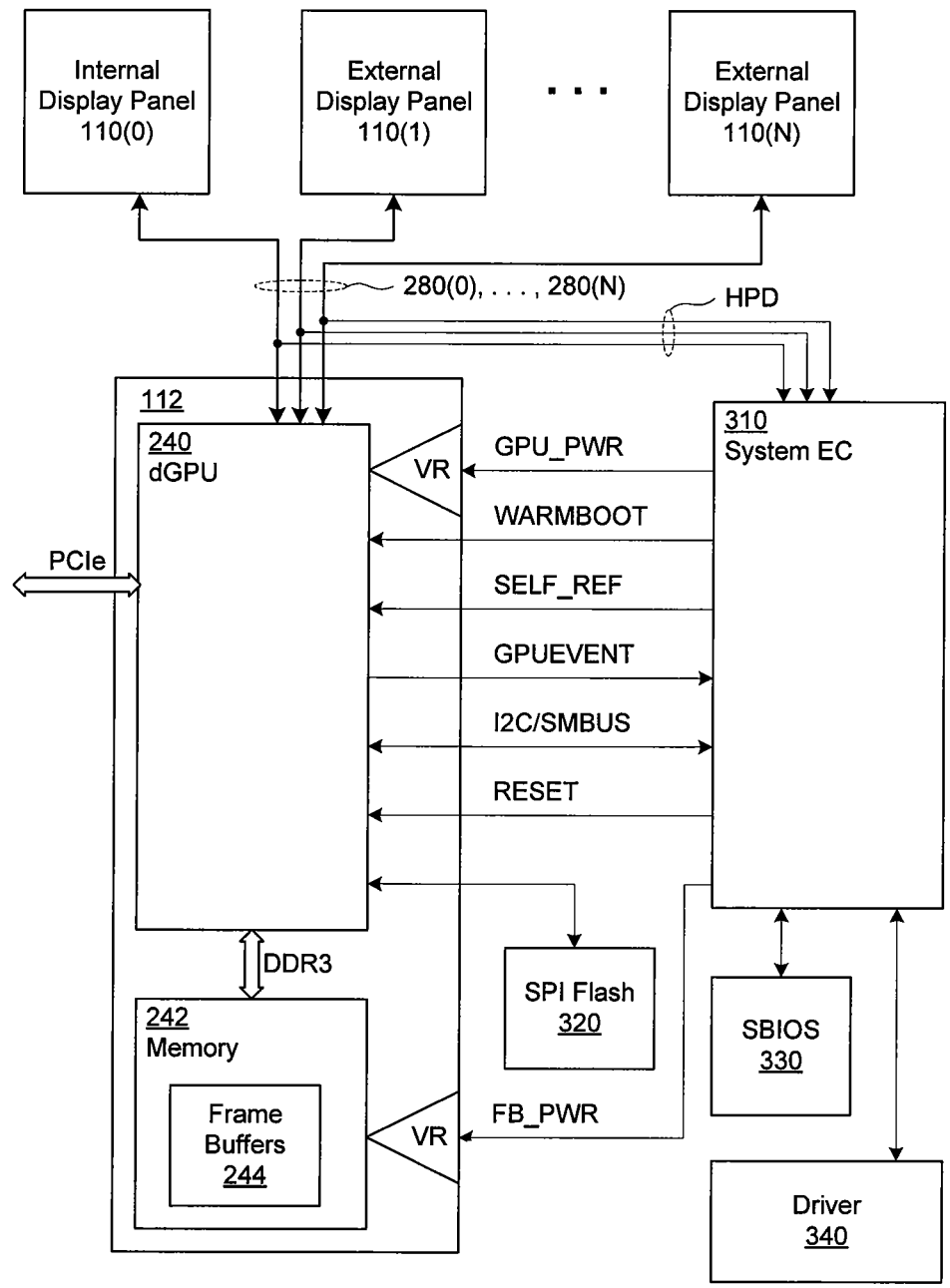
FIG. 3 illustrates communication signals between parallel processing subsystem and various components of computer system, according to one embodiment of the present invention.

FIG. 3 illustrates communication signals between parallel processing subsystem 112 and various components of computer system 100, according to one embodiment of the present invention. As shown, computer system 100 includes an embedded controller (EC) 310, an SPI flash device 320, a system basic input/output system (SBIOS) 330, and a driver 340. EC 310 may be an embedded controller that implements an advanced configuration and power interface (ACPI) that allows an operating system executing on CPU 102 to configure and control the power management of various components of computer system 100. In one embodiment, EC 310 allows the operating system executing on CPU 102 to communicate with GPU 240 via driver 340 even when the PCIe bus is down. For example, if GPU 240 and the PCIe bus are shut down in a power saving mode, the operating system executing on CPU 102 may instruct EC 310 to wake-up GPU 240 by sending a notify ACPI event to EC 310 via driver 340.

Computer system 100 may also include multiple display devices 110 such as an internal display panel 110(0) and one or more external display panels 110(1),,, 110(N). Each of the one or more display devices 110 may be connected to GPU 240 via communication paths 280(0) . . . 280(N). In one embodiment, each of the HPD signals included in communication paths 280 are also connected to EC 310. When one or more display devices 110 are operating in a panel self-refresh mode, EC 310 may be responsible for monitoring HPD and waking-up GPU 240 if EC 310 detects a hot-plug event or an interrupt request from one of the display devices 110.

In one embodiment, a FRAME_LOCK signal is included between internal display device 110(0) and GPU 240. FRAME_LOCK passes a synchronization signal from the display device 110(0) to GPU 240. For example, GPU 240 may synchronize video signals generated from pixel data in frame buffers 244 with the FRAME_LOCK signal. FRAME_LOCK may indicate the start of the active frame such as by passing the vertical sync signal used by TCON 210 to drive LCD device 216 to GPU 240.

EC 310 transmits the GPU_PWR and FB_PWR signals to voltage regulators that provide a supply voltage to the GPU 240 and frame buffers 244, respectively. EC 310 also transmits the WARMBOOT, SELF_REF and RESET signals to GPU 240 and receives a GPUEVENT signal from GPU 240. Finally, EC 310 may communicate with GPU 240 via an I2C or SMBus data bus. The functionality of these signals is described below.

The GPU_PWR signal controls the voltage regulator that provides GPU 240 with a supply voltage. When display device 110 enters a self-refresh mode, an operating system executing on CPU 102 may instruct EC 310 to kill power to GPU 240 by making a call to driver 340. Driver 340 will then drive the GPU_PWR signal low to kill power to GPU 240 to reduce the overall power consumption of computer system 100. Similarly, the FB_PWR signal controls the voltage regulator that provides frame buffers 244 with a supply voltage. When display device 110 enters the self-refresh mode, computer system 100 may also kill power to frame buffers 244 in order to further reduce overall power consumption of computer system 100. The FB_PWR signal is controlled in a similar manner to the GPU_PWR signal. The RESET signal may be asserted during wake-up of the GPU 240 to hold GPU 240 in a reset state while the voltage regulators that provide power to GPU 240 and frame buffers 244 are allowed to stabilize.

The WARMBOOT signal is asserted by EC 310 to indicate that GPU 240 should restore an operating state from SPI flash device 320 instead of performing a full, cold-boot sequence. In one embodiment, when display device 110 enters a panel self-refresh mode, GPU 240 may be configured to save a current state in SPI flash device 320 before GPU 240 is powered down. GPU 240 may then restore an operating state by loading the saved state information from SPI flash device 320 upon waking-up. Loading the saved state information reduces the time required to wake-up GPU 240 relative to performing a full, cold-boot sequence. Reducing the time required to wake-up GPU 240 is advantageous during high frequency entry and exit into a panel self-refresh mode.

The SELF_REF signal is asserted by EC 310 when display device 110 is operating in a panel self-refresh mode. The SELF_REF signal indicates to GPU 240 that display device 110 is currently operating in a panel self-refresh mode and that communications path 280 should be isolated to prevent transients from disrupting the data stored in local frame buffers 224. In one embodiment, GPU 240 may connect communications path 280 to ground through weak, pull-down resistors when the SELF_REF signal is asserted.

The GPUEVENT signal allows the GPU 240 to indicate to CPU 102 that an event has occurred, even when the PCIe bus is off. GPU 240 may assert the GPUEVENT to alert system EC 310 to configure the I2C/SMBUS to enable communication between the GPU 240 and the system EC 310. The I2C/SMBUS is a bidirectional communication bus configured as an I2C, SMBUS, or other bidirectional communication bus to enable GPU 240 and system EC 310 to communicate. In one embodiment, the PCIe bus may be shut down when display device 110 is operating in a panel self-refresh mode. The operating system may notify GPU 240 of events, such as cursor updates or a screen refresh, through system EC 310 even when the PCIe bus is shut down.

Figure 4:
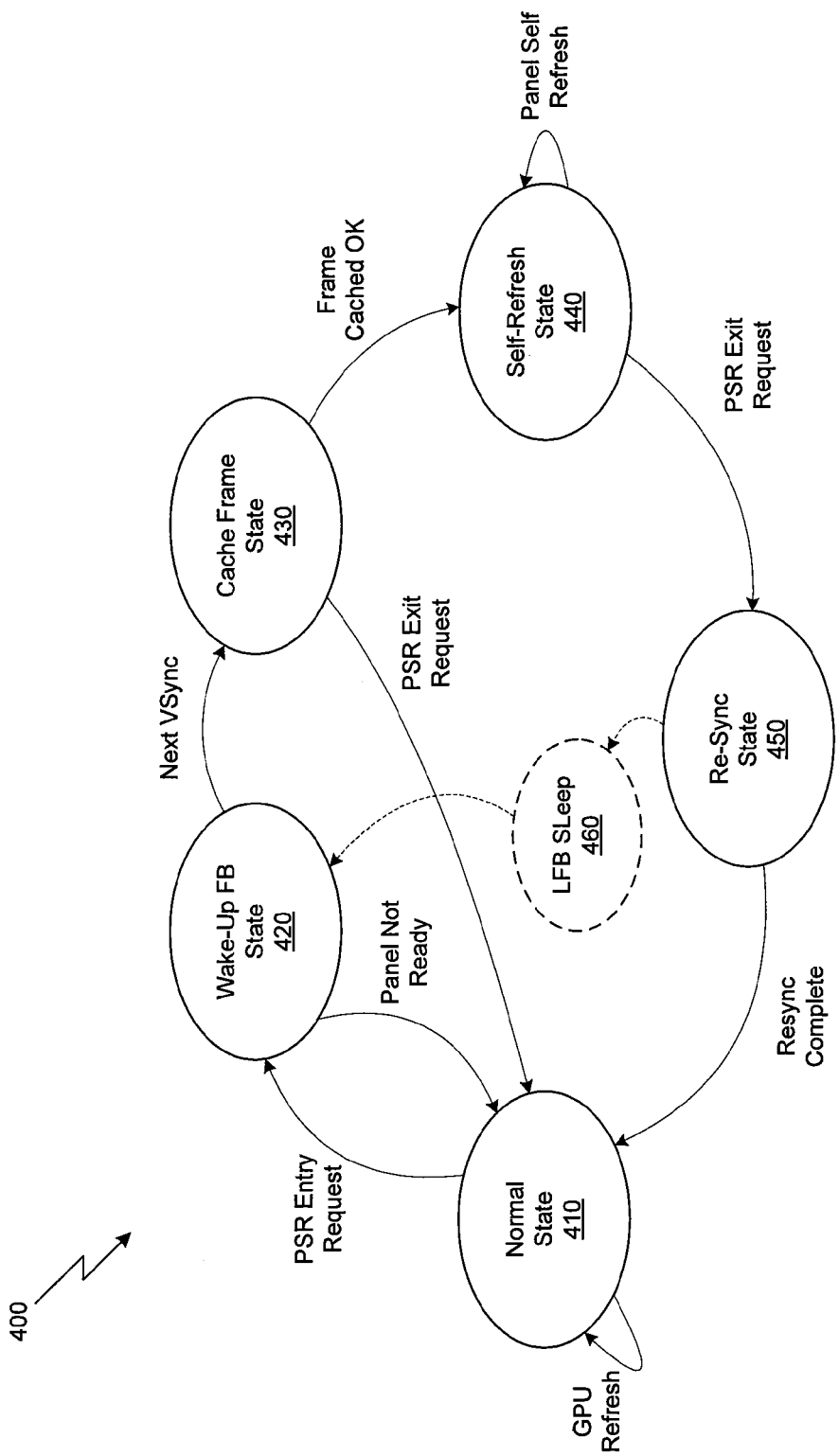
FIG. 4 is a state diagram for a display device having a self-refreshing capability, according to one embodiment of the present invention.

FIG. 4 is a state diagram 400 for a display device 110 having a self-refreshing capability, according to one embodiment of the present invention. As shown, display device 110 begins in a normal state 410. In the normal state 410, display device receives video signals from GPU 240. TCON 210 drives the LCD device 216 using the video signals received from GPU 240. In the normal operating state, display device 110 monitors communications path 280 to determine if GPU 240 has issued a panel self-refresh entry request. If display device 110 receives the panel self-refresh entry request, then display device 110 transitions to a wake-up frame buffer state 420.

In the wake-up frame buffer state 420, display device 110 wakes-up the local frame buffers 224. If display device 110 cannot initialize the local frame buffers 224, then display device 110 may send an interrupt request to GPU 240 indicating that the display device 110 has failed to enter the panel self-refresh mode and display device 110 returns to normal state 410. In one embodiment, display device 110 may be required to initialize the local frame buffers 224 before the next frame of video is received over communications path 280 (i.e., before the next rising edge of the VSync signal generated by GPU 240). Once display device 110 has completed initializing local frame buffers 224, display device 110 transitions to a cache frame state 430.

In the cache frame state 430, display device 110 waits for the next falling edge of the VSync signal generated by GPU 240 to begin caching one or more frames of video in local frame buffers 224. In one embodiment, GPU 240 may indicate how many consecutive frames of video to store in local frame buffers 224 by writing a value to a control register in display device 110. After display device has stored the one or more frames of video in local frame buffers 224, display device 110 transitions to a self-refresh state 440.

In the self-refresh state 440, the display device 110 enters a panel self-refresh mode where TCON 210 drives the LCD device 216 with video signals generated by SRC 220 based on pixel data stored in local frame buffers 224. Display device 110 stops driving the LCD device 216 based on the video signals generated by GPU 240. Consequently, GPU 240 and communications path 280 may be placed in a power saving mode to reduce the overall power consumption of computer system 100. While in the self-refresh state 440, display device 110 may monitor communications path 280 to detect a request from GPU 240 to exit the panel self-refresh mode. If display device 110 receives a panel self-refresh exit request, then display device 110 transitions to a re-sync state 450.

In the re-sync state 450, display device 110 attempts to re-synchronize the video signals generated by GPU 240 with the video signals generated by SRC 220. Various techniques for re-synchronizing the video signals are described below in conjunction with FIGS. 9A-9C and 10-13. When display device 110 has completed re-synchronizing the video signals, then display device 110 transitions back to a normal state 410. In one embodiment, display device 110 will cause the local frame buffers 224 to transition into a local frame buffer sleep state 460, where power supplied to the local frame buffers 224 is turned off.

In one embodiment, display device 110 may be configured to quickly exit wake-up frame buffer state 420 and cache frame state 430 if display device 110 receives an exit panel self-refresh exit request. In both of these states, display device 110 is still synchronized with the video signals generated by GPU 240. Thus, display device 110 may transition quickly back to normal state 410 without entering re-sync state 450. Once display device 110 is in self-refresh state 440, display device 110 is required to enter re-sync state 450 before returning to normal state 410.

Figure 5:
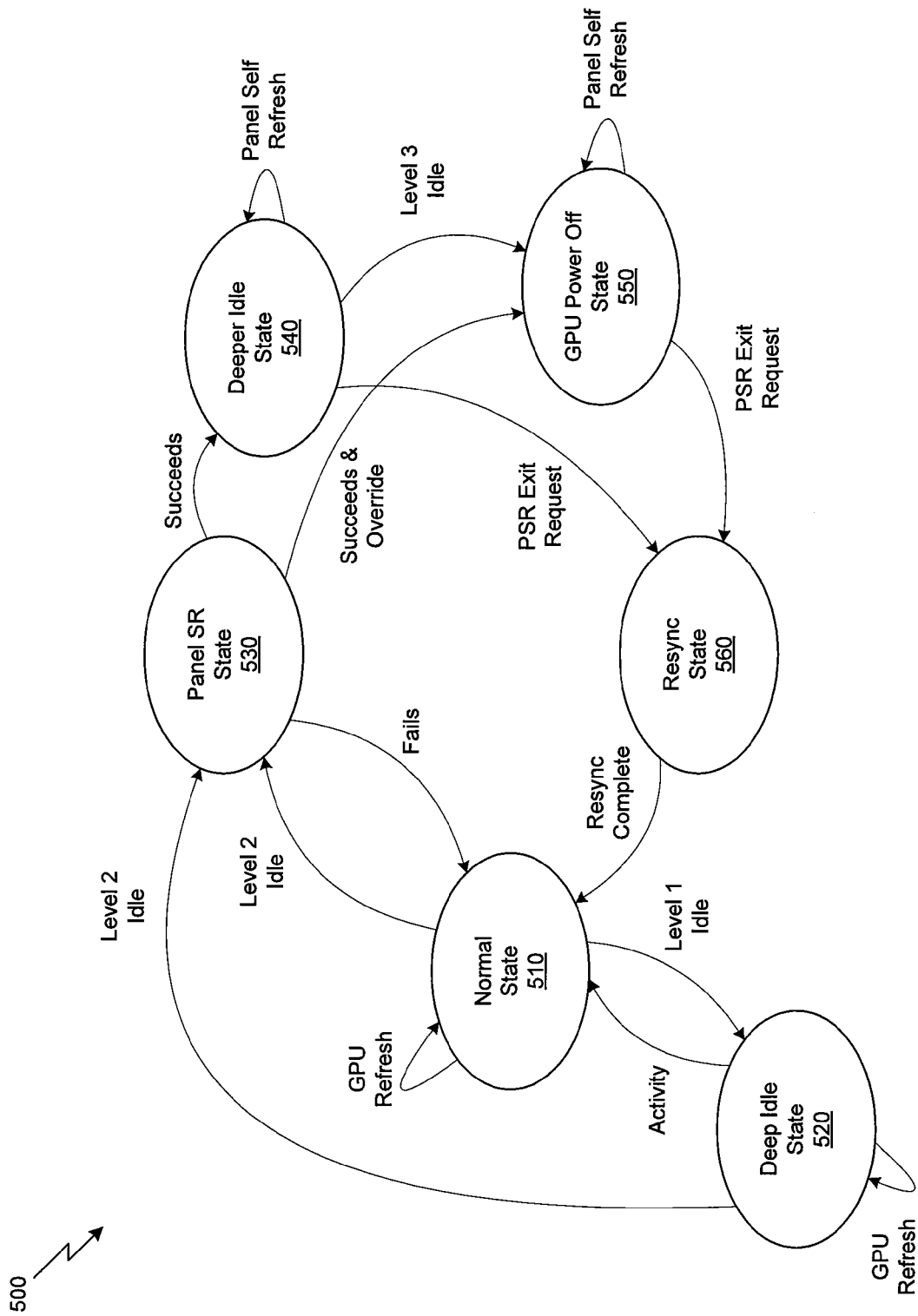
FIG. 5 is a state diagram for a GPU configured to control the transition of a display device into and out of a panel self-refresh mode, according to one embodiment of the present invention.

FIG. 5 is a state diagram 500 for a GPU 240 configured to control the transition of a display device 110 into and out of a panel self-refresh mode, according to one embodiment of the present invention. After initial configuration from a cold-boot sequence, GPU 240 enters a normal state 510. In the normal state, GPU 240 generates video signals for transmission to display device 110 based on pixel data stored in frame buffers 244. In one embodiment, GPU 240 monitors pixel data in frame buffers 244 to detect one or more progressive levels of idleness in the pixel data. For example, GPU 240 may compare the current frame of pixel data in frame buffers 244 with the previous frame of pixel data in frame buffers 244 to detect any graphical activity in the pixel data. Graphical activity may be detected if the pixel data is different between the two frames. In alternative embodiments, GPU 240 may detect progressive levels of idleness based on a factor other than the comparison of consecutive frames of pixel data in frame buffers 244. If GPU 240 fails to detect any graphical activity in the pixel data stored in frame buffers 244, then GPU 240 may increment a counter that indicates the number of consecutive frames of video without any graphical activity. If the counter reaches a first threshold value, then GPU 240 transitions to a deep-idle state 520.

In the deep-idle state 520, GPU 240 still generates video signals for display on display device 110. However, GPU 240 operates in a power saving mode, such as by clock-gating or power-gating certain processing portions of GPU 240 while keeping the portions of GPU 240 responsible for generating the video signals active. Additionally, GPU 240 may send a message to display device 110 requesting display device 110 to drive LCD device 216 at a lower refresh rate. For example, GPU 240 may request display device 110 to reduce the refresh rate from 75 Hz to 30 Hz, and GPU 240 may generate and transmit video signals based on the lower refresh rate. While operating in deep-idle state 520, GPU 240 may continue to monitor pixel data in frame buffers 244 for graphical activity. If GPU 240 detects graphical activity, GPU 240 transitions back to normal state 510. Returning to deep-idle state 520, GPU 240 may continue to increment the counter to determine the number of consecutive frames of video without any graphical activity. If the counter reaches a second threshold value, that is greater than the first threshold value, then GPU 240 transitions to a panel self-refresh state 530.

In some embodiments, the state diagram 500 does not include the deep-idle state 520. In such embodiments, GPU 240 may transition directly from the normal state 510 to the panel self-refresh state 530 when the counter reaches the second threshold value. In yet other embodiments, EC 310, graphics driver 103, or some other dedicated monitoring unit, may perform the monitoring of the pixel data in frame buffers 244 and send a message to GPU 240 over the I2C/SMBUS indicating that one of the progressive levels of idleness has been detected.

In the panel self-refresh state 530, GPU 240 transmits the one or more video frames for display during the panel self-refresh mode to display device 110. GPU 240 may monitor communications path 280 to detect a failure by display device 110 in entering self-refresh mode. In one embodiment, GPU 240 monitors the HPD signal to detect an interrupt request issued by display device 110. If GPU 240 detects an interrupt request from display device 110, then GPU 240 may configure the Auxiliary channel of communications path 280 to receive communications from display device 110. If display device 110 indicates that entry into self-refresh mode did not succeed, then GPU 240 may transition back to normal state 510. Otherwise, GPU 240 transitions to a deeper-idle state 540. In another embodiment, GPU 240 may override the transition into the deeper idle state 540 and transition directly into GPU power off state 550. In such embodiments, the GPU 240 will be completely shut down whenever display device 110 enters a panel self-refresh mode.

In the deeper-idle state 540, GPU 240 may be placed in a sleep state and the transmitter side of communications path 280 may be shut down. Portions of GPU 240 may be clock-gated or power-gated in order to reduce the overall power consumption of computer system 100. Display device 110 is responsible for refreshing the image displayed by display device 110. In one embodiment, GPU 240 may continue to monitor the pixel data in frame buffers 244 to detect a third level of idleness. For example, GPU 240 may continue to increment a counter for each frame of video where GPU 240 fails to update the pixel data in frame buffers 244. If GPU 240 detects graphical activity, such as by receiving a signal from EC 310 over the I2C/SMBUS or from graphics driver 103 over the PCIe bus, then GPU 240 transitions to the re-sync state 560. In contrast, if GPU 240 detects a third level of idleness in the pixel data, then GPU 240 transitions to a GPU power-off state 550.

In the GPU power-off state 550, EC 310 shuts down GPU 240 by turning off the voltage regulator supplying power to GPU 240. EC 310 may drive the GPU_PWR signal low to shut down the voltage regulator supplying GPU 240. In one embodiment, GPU 240 may save the current operating context in SPI flash device 320 in order to perform a warm-boot sequence on wake-up. In GPU power off state 550, a voltage regulator supplying power to graphics memory 242 may also be turned off. EC 310 may drive the FB_PWR signal low to shut down the voltage regulator supplying graphics memory 242.

When GPU 240 is in either the deeper-idle state 540 or the GPU power-off state 550, GPU 240 may be instructed to wake-up by EC 310 to update the image being displayed on display device 110. For example, a user of computer system 100 may begin typing into an application that requires GPU 240 to update the image displayed on the display device. In one embodiment, driver 340 may instruct EC 310 to assert the GPU_PWR and FB_PWR signals to turn on the voltage regulators supplying GPU 240 and frame buffers 244. When GPU 240 is turned on, GPU 240 will perform a boot sequence based on the status of the WARMBOOT signal and the RESET signal. If EC 310 asserts the WARM_BOOT signal, then GPU 240 may load a stored context from the SPI flash device 320. Otherwise GPU 240 may perform a cold-boot sequence. GPU 240 may also configure the transmitter side of communications path 280 based on information stored in SPI flash device 320. After GPU 240 has performed the boot sequence, GPU 240 may send a panel self-refresh exit request to display device 110. GPU 240 then transitions to a re-sync state 560.

In the re-sync state 560, GPU 240 begins generating video signals based on pixel data stored in frame buffers 244. The video signals are transmitted to display device 110 over communications path 280 and display device 110 attempts to re-synchronize the video signals generated by GPU 240 with the video signals generated by SRC 220. After re-synchronizing the video signals is complete, GPU 240 transitions back to the normal state 510.

Sparse Refresh

In one mode of operation, GPU 240 may be required to update the pixel data stored in frame buffers 224 infrequently. This mode of operation where pixel data in a self-refreshing display device may be updated infrequently is referred to as "sparse refresh." During such operation, prolonged periods of graphical inactivity may be interspersed between short periods requiring an update to the image being displayed. For example, such updates may be required by a blinking text carat or in response to a user scrolling through a web page or document. In such cases, the GPU 240 and any associated communications channels, such as a PCIe bus, may be woken-up. Once all required components are initialized, new pixel data may be processed by the GPU, a new frame of video may be transmitted to display device 110, and GPU 240 and any associated communications channels may be returned to a power-saving mode.

In a conventional system, the CPU 102 sends commands and data to the GPU 240 via the graphics driver 103. These commands and data may be transmitted over communications path 113, such as a PCIe bus coupled between the memory bridge 105 and the parallel processing subsystem 112. When GPU 240 is operating in a panel self-refresh mode, GPU 240 and any associated communications channels may be placed in a power-saving mode. In order to process commands and data to generate updated pixel data for display on display device 110, CPU 102 may cause the GPU 240 and associated communication channels to "wake-up." The process of waking-up the GPU 240 and communication channels may take 100 ms or more. During sparse refresh, such a process may be repeated on the order of once per second or more. Repeatedly causing the display device 110 to exit and re-enter a panel self-refresh mode to perform minor updates to the image being displayed may waste energy as well as manifest as latency in update of the display device.

Figure 6A:
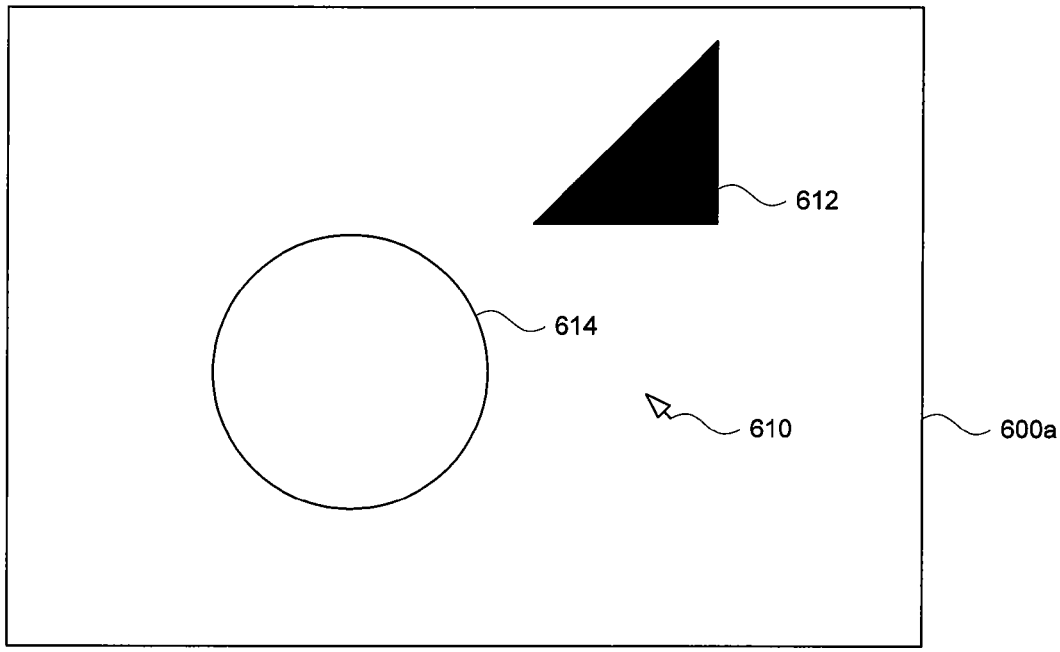
FIGS. 6A-6D illustrate various frames of video displayed by display device while operating in a sparse refresh mode, according to one embodiment of the present invention.

FIGS. 6A-6D illustrate various frames 600 of video displayed by display device 110 while operating in a sparse refresh mode, according to one embodiment of the present invention. As shown in FIG. 6A, a video frame 600a includes cursor 610 as well as graphics objects 612 and 614. In sparse refresh mode, GPU 240 has rendered video frame 600a, requested display device 110 to enter a panel self-refresh mode, transmitted video frame 600a to display device 110 to be cached in local frame buffers 224, and entered a power-saving mode such as GPU power-off state 550. Display device 110 is configured to scan-out video frame 600a from local frame buffers 224 for display on LCD device 216. GPU 240 may then operate in a sparse refresh mode where overall power consumption may be reduced by exploiting the fact that infrequent updates typically require only a small amount of data to be passed from CPU 102 to GPU 240. For example, a blinking cursor 610 may only require the portion of video frame 600a covered by cursor 610 to be updated at a frequency of 0.5 Hz. Thus, commands and data may be passed to GPU 240 via a low bandwidth auxiliary communications path instead of the high-bandwidth communications path 113. In one embodiment, commands and data may be transmitted over the auxiliary I2C/SMBUS connecting EC 310 to GPU 240. In alternative embodiments, commands and data may be transmitted over an SMBUS included on spare pins of the PCIe interface.

Figure 6B:
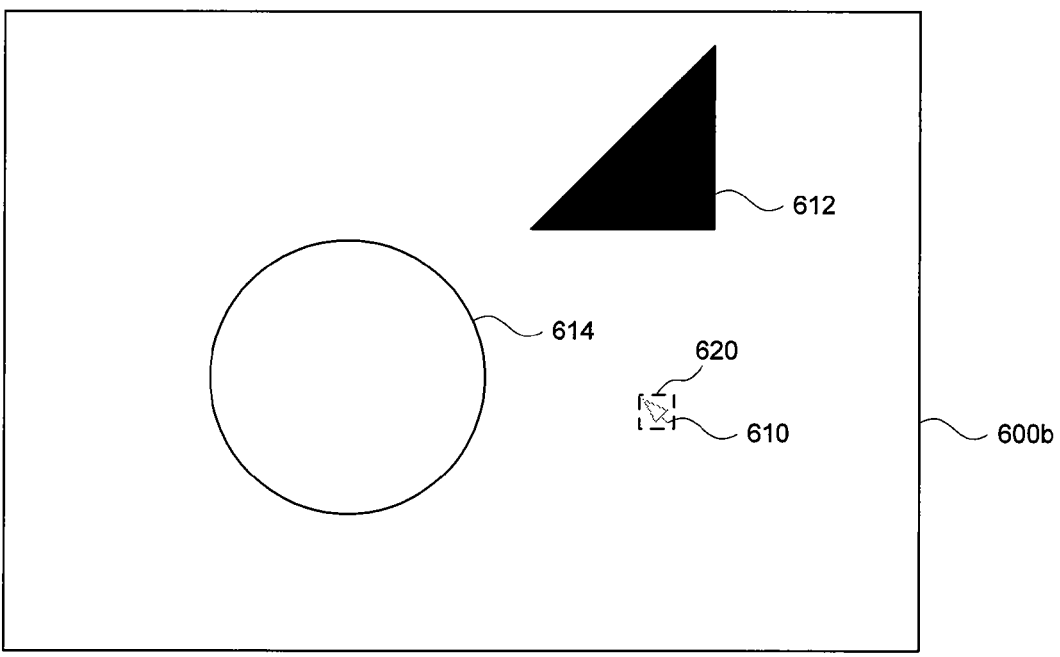

As shown in FIG. 6B, video frame 600b includes graphics objects 612 and 614 as well as cursor 610. Video frame 600b is similar to video frame 600a except that the display of cursor 610 is changed. In one embodiment, cursor 610 may be grayed out. In alternative embodiments, cursor 610 may blink, such as being visible for one second and hidden for the next subsequent second, or change shape. For example, when a user selects a document in a word processor application, cursor 610 could change into a blinking text carat that indicates the location in the document where input from the keyboard is inserted. Pixels 620 represent the updated pixels in order to change video frame 600a to video frame 600b. The number of pixels included in pixels 620 is small in comparison to the total number of pixels in the entire video frame 600b.

In order to update the cached frame of video in local frame buffers 224, graphics driver 103 causes EC 310 to wake-up GPU 240 and exit panel self-refresh mode. Graphics driver 103 may also transmit commands and data to EC 310 that are passed to GPU 240 via a low-bandwidth communications channel. The commands and data, when executed by GPU 240, cause GPU 240 to generate the updated pixel data included in pixels 620. EC 310 may wake-up GPU 240 by setting GPU_PWR and FB_PWR high to turn on the voltage regulators that supply power to the GPU 240 and the frame buffers 244, respectively. EC 310 may also keep the WARMBOOT and RESET signals high for a short time until the voltage supplied from the voltage regulators stabilizes. Then, EC 310 drops the RESET signal low and GPU 240 executes microcode from an on-chip memory as well as SPI flash device 320, the microcode being configured to perform an initialization operation. In response to the WARMBOOT signal being set by EC 310, GPU 240 executes a "fast-resume" routine. In one embodiment, the "fast-resume" routine is configured to perform a subset of a full cold-boot sequence for GPU 240. Context or processor state may be loaded from data stored in SPI flash device 320 to reduce time to initialize GPU 240. Once GPU 240 has initialized, GPU 240 queries EC 310 to determine the reason GPU 240 was brought out of the power-saving state. If the reason is to perform a sparse refresh operation, such as updating a single frame of video in local frame buffers 224, then GPU 240 may complete initialization after executing the "fast-resume" routine. If the reason is to resume normal operation, then GPU 240 may perform additional configuration operations. In one embodiment, EC 310 and GPU 240 may communicate via an auxiliary communications channel such as the I2C/SMBUS connecting GPU 240 and EC 310. Once GPU 240 has been initialized, GPU 240 is ready to generate pixel data required to update the frame of video cached in local frame buffers 224.

Figure 6C:
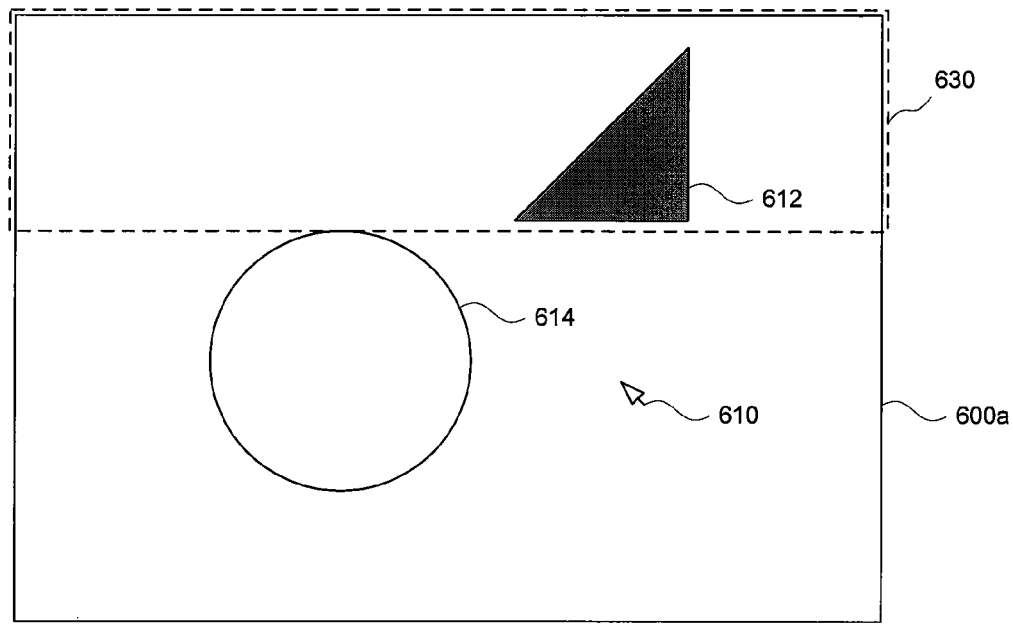
Figure 6D:
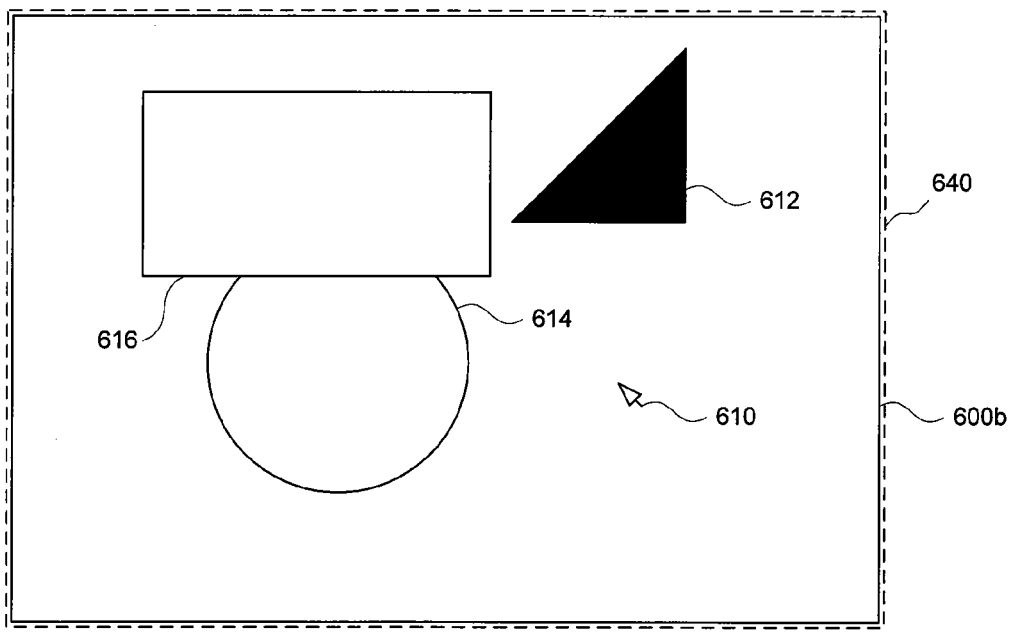

In one embodiment, EC 310 transmits the commands and data received from graphics driver 103 to GPU 240 via the I2C/SMBUS. After receiving the commands and data, GPU 240 sets a display mode and wakes-up communications path 280, such as by writing data from SPI flash device into registers associated with a transmit interface of communications path 280. GPU 240 generates the updated pixel data and stores the data in frame buffers 244. When GPU 240 is ready to transmit the updated pixel data to display device 110, GPU 240 causes display device 110 to exit panel self-refresh mode, such as by transmitting a panel self-refresh exit request to display device 110. In one embodiment, GPU 240 transmits pixels 620 to display device 110, which are loaded into the corresponding addresses of local frame buffers 224 associated with the pixel locations of pixels 620. In alternative embodiments, GPU 240 may transmit each horizontal line of video frame 600b that includes at least one pixel of pixels 620. In yet other embodiments, GPU 240 may transmit either a portion of video frame 600b, such as the first horizontal line through the last horizontal line that includes at least one pixel of pixels 620, or all of video frame 600b. For example, as shown in FIG. 6C, the color of graphics object 612 is changed in video frame 600c. In such a case, GPU 240 may transmit the portion of video frame 600b corresponding to pixels 630. As shown in FIG. 6D, a new graphics object 616 is included in video frame 600d. In such a case, GPU 240 may transmit the entire video frame 600d that corresponds to pixels 640.

In one embodiment, GPU 240 may be configured to update pixel data in display device 110 without causing display device 110 to exit panel self-refresh mode. For example, in the case where a small amount of pixel data is to be updated, such as pixels 620, display device 110 may be configured to transition from self-refresh state 440 to cache frame state 430. Once display device 110 is operating in cache frame state 430, GPU 240 transmits the updated pixel data to display device 110 and the updated pixel data is stored to corresponding memory addresses in local frame buffers 224. Display device 110 may the transition back to self-refresh state 440 and the display device 110 may return to driving LCD 216 with video signals generated by SRC 220 based on the updated pixel data in local frame buffers 224.

In one embodiment, GPU 240 may transmit the updated video data via a high-bandwidth video interface such as over one or more lanes of the main link of communications path 280. In alternative embodiments, GPU 240 may transmit the updated video data via a low-bandwidth communications channel such as the auxiliary communications channel of communications path 280.

Figure 7:
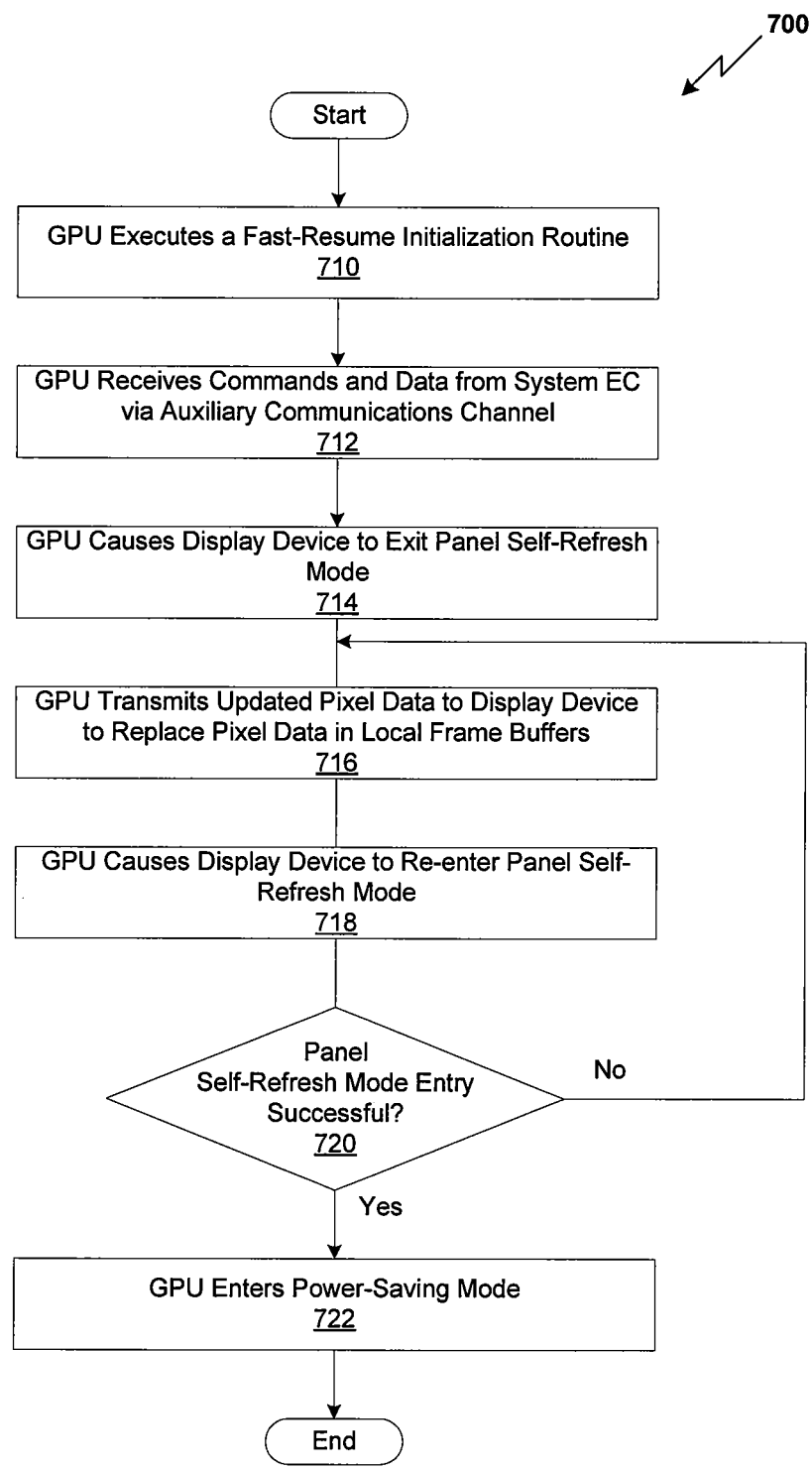
FIG. 7 sets forth a flowchart of a method for updating frames of video in a display device while operating in a sparse refresh mode, according to one embodiment of the present invention.

FIG. 7 sets forth a flowchart of a method 700 for updating frames 600 of video in a display device 110 while operating in a sparse refresh mode, according to one embodiment of the present invention. Although the method steps are described in conjunction with the systems of FIGS. 1, 2A-2D, 3-5 and 6A-6D, persons skilled in the art will understand that any system configured to perform the method steps, in any order, is within the scope of the invention.

The method begins at step 710, where GPU 240 is re-initialized to transition out of GPU power-off state 550 or some other power-saving mode. In one embodiment, a "fast-resume" routine is executed by GPU 240 to resume operation in a sparse refresh mode. At step 712, GPU 240 receives commands and data from EC 310 that cause GPU 240 to generate the updated pixel data for display on display device 110. At step 714, GPU 240 causes display device 110 to exit a panel self-refresh mode. In one embodiment, GPU 240 transmits a panel self-refresh exit request to display device 110.

At step 716, GPU 240 transmits the updated pixel data to display device 110 to be displayed on display device 110. In one embodiment, only a portion of a video frame is transmitted to display device 110. In alternative embodiments, one or more complete video frames are transmitted to display device 110. At step 718, GPU 240 causes display device 110 to re-enter the panel self-refresh mode. In one embodiment, GPU 240 transmits a panel self-refresh entry request to display device 110. At step 720, GPU 240 determines whether display device 110 has entered a panel self-refresh mode and is scanning out the updated video frame to LCD device 216. In one embodiment, GPU 240 waits one or more frames to detect whether display device 110 transmits an interrupt request, such as by toggling the HPD signal of communications path 280. If display device 110 has not entered panel self-refresh mode, then GPU 240 returns to step 716 where the GPU 240 may retransmit the updated pixel data and send another panel self-refresh entry request. However, if display device 110 has entered panel self-refresh mode, then at step 722 GPU 240 is placed in a power saving state such as GPU power-off state 550 and method 700 terminates.

In sum, the disclosed technique enables the GPU and associated communications channels to be re-initialized during a sparse refresh mode using an alternative initialization routine that is a merely a subset of the initialization routine executed during a cold-boot sequence. Once initialized with a fast-resume routine, the GPU may cause the display device to exit a panel self-refresh mode, transmit updated pixel data to the display device to be cached in one or more local frame buffers, and cause the display device to re-enter the panel self-refresh mode where the updated pixel data is used to generate the video signals that drive an LCD device.

One advantage of the disclosed technique is that initialization of the GPU as well as high speed communication channels may be minimized. The technique exploits the fact that, while operating in a sparse refresh mode, the bandwidth required to pass commands and data to a graphics controller may be small. Therefore, high speed communication channels may be bypassed in favor of low speed communication channels that require less time and energy to configure. In so doing, the time required to update a small amount of image data stored in the display device and the overall power consumption of the computer system are reduced.

While the foregoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the invention.

In view of the foregoing, the scope of the invention is determined by the claims that follow.

What is claimed is:

1. A method for controlling a display device that has self-refresh capabilities, the method comprising:
   exiting a power-saving state, wherein the power-saving state comprises a state where a graphics processing unit (GPU) is placed in a sleep state and a transmitter side of a communications path coupled between the GPU and the display device is shut down;
   executing a fast resume routine that includes only a portion of the operations included in a full initialization routine;
   generating updated pixel data for display on the display device based on commands and data received via an auxiliary communications channel that is included in the communications path;
   causing the display device to exit a panel self-refresh mode after the commands and data are received via the auxiliary communications channel;
   transmitting the updated pixel data to the display device; and
   continuing with a full initialization operation that includes operations not included in the fast resume routine after transmitting the updated pixel data to the display device.

2. The method of claim 1, wherein the updated pixel data comprises a portion of a video frame.

3. The method of claim 1, wherein the updated pixel data comprises one or more complete video frames.

4. The method of claim 1, further comprising causing the display device to re-enter the panel self-refresh mode once the updated pixel data has been transmitted to the display device.

5. The method of claim 1, wherein the step of returning to the power-saving state comprises causing a voltage regulator that provides a supply voltage to a graphics processing unit (GPU) to be turned off.

6. The method of claim 1, wherein the step of executing the fast resume routine comprises executing one or more instructions stored in a non-volatile memory coupled to a graphics processing unit (GPU).

7. The method of claim 6, wherein the non-volatile memory comprises a dedicated flash memory coupled to the GPU via a serial bus.

8. A system for controlling a display device that has self-refresh capabilities, the system comprising a graphics processing unit (GPU) coupled to the display device and configured to:

exit a power-saving state, wherein the power0-saving state comprises a state where a graphics processing unit (GPU) is placed in a sleep state and a transmitter side of a communications path coupled between the GPU and the display device is shut down;

execute a fast resume routine that includes only a portion of the operations included in a full initialization routine;

generate updated pixel data for display on the display device based on commands and data received via an auxiliary communications channel that is included in the communications path;

causing the display device to exit a panel self-refresh mode after the commands and data are received via the auxiliary communications channel;

transmit the updated pixel data to the display device; and continuing with a full initialization operation that includes operations not included in the fast resume routine after transmitting the updated pixel data to the display device.

9. The system of claim 8, wherein the updated pixel data comprises a portion of a video frame.

10. The system of claim 8, wherein the updated pixel data comprises one or more complete video frames.

11. The system of claim 8, the GPU further configured to: cause the display device to re-enter the panel self-refresh mode once the updated pixel data has been transmitted to the display device.

12. The system of claim 8, wherein the step of returning to the power-saving state comprises causing a voltage regulator that provides a supply voltage to the GPU to be turned off.

13. The system of claim 8, wherein the step of executing the fast resume routine comprises executing one or more instructions stored in a non-volatile memory coupled to the GPU.

14. The system of claim 13, wherein the non-volatile memory comprises a dedicated flash memory coupled to the GPU via a serial bus.

15. A non-transitory machine-readable storage medium including instructions that, when executed by a processor, perform the steps of:

exiting a power-saving state, wherein the power-saving state comprises a state where a graphics processing unit (GPU) is placed in a sleep state and a transmitter side of a communications path coupled between the GPU and the display device is shut down;

executing a fast resume routine that includes only a portion of the operations included in a full initialization routine;

generating updated pixel data for display on the display device based on commands and data received via an auxiliary communications channel that is included in the communications path;

causing the display device to exit a panel self-refresh mode after the commands and data are received via the auxiliary communications;

transmitting the updated pixel data to the display device; and continuing with a full initialization operation that includes operations not included in the fast resume routine after transmitting the updated pixel data to the display device.

16. The non-transitory machine-readable storage medium of claim 15, wherein the updated pixel data comprises a portion of a video frame.

17. The non-transitory machine-readable storage medium of claim 15, wherein the updated pixel data comprises one or more complete video frames.

18. The non-transitory machine-readable storage medium of claim 15, the steps further comprising:

causing the display device to re-enter the panel self-refresh mode once the updated pixel data has been transmitted to the display device.

19. The method of claim 1, wherein the step of returning to the power saving state comprises turning off power to one or more frame buffers.

20. The method of claim 1, wherein secondary data packets that include messages that cause the display device to exit the panel self-refresh mode replace a plurality of dummy symbols in a signal transmitted to the display device during link symbol clock cycles.

21. The method of claim 1, wherein exiting a power-saving state comprises a graphics processing unit (GPU) performing a subset of a cold-boot sequence.

22. The method of claim 19, wherein each of the one or more frame buffers are sized to hold one frame of stereoscopic video data, and wherein each frame of stereoscopic video data includes two uncompressed frames of pixel data.

23. The method of claim 1, wherein:
the fast resume routine comprises:
loading processor state from data stored in a flash device;
querying an embedded controller to determine a reason for which the power-saving state was exited; and
determining that the reason was to perform a sparse refresh operation; and
the full initialization operation is continued after transmitting the updated pixel data in response to determining that the reason was to perform the sparse refresh operation.

* * * * *

UNITED STATES PATENT AND TRADEMARK OFFICE
CERTIFICATE OF CORRECTION

PATENT NO.        : 9,047,085 B2
APPLICATION NO.   : 13/047642
DATED             : June 2, 2015
INVENTOR(S)       : David Wyatt et al.

It is certified that error appears in the above-identified patent and that said Letters Patent is hereby corrected as shown below:

IN THE CLAIMS:

Claim 8, Column 19, line 1, please delete "power0-saving" and insert --power-saving-- therefor;

Claim 15, Column 20, line 3, please insert --channel-- after "communications".

Signed and Sealed this
Twenty-ninth Day of March, 2016

Michelle K. Lee
*Director of the United States Patent and Trademark Office*